July 18, 1939.   C. E. HILLERY-COLLINGS   2,166,543
FILM MAGAZINE FOR CINEMATOGRAPHIC CAMERAS
Filed Nov. 23, 1935   2 Sheets-Sheet 2
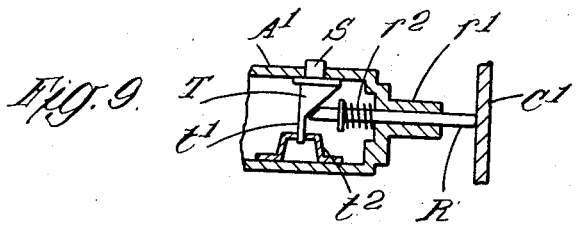
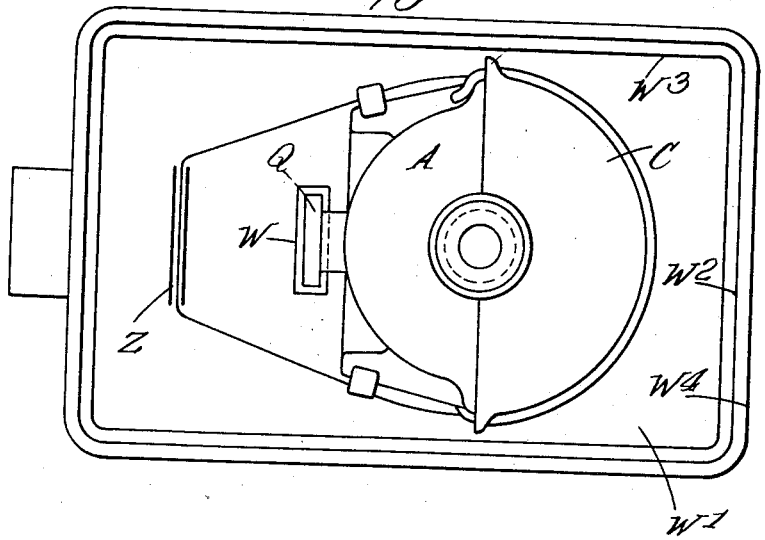
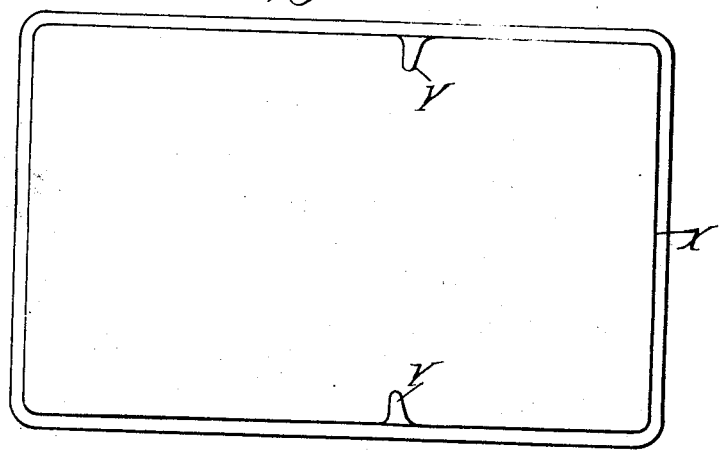
INVENTOR:
CHARLES EDWARD HILLERY-COLLINGS
BY Haseltine, Lake & Co.
ATTORNEYS Patented July 18, 1939

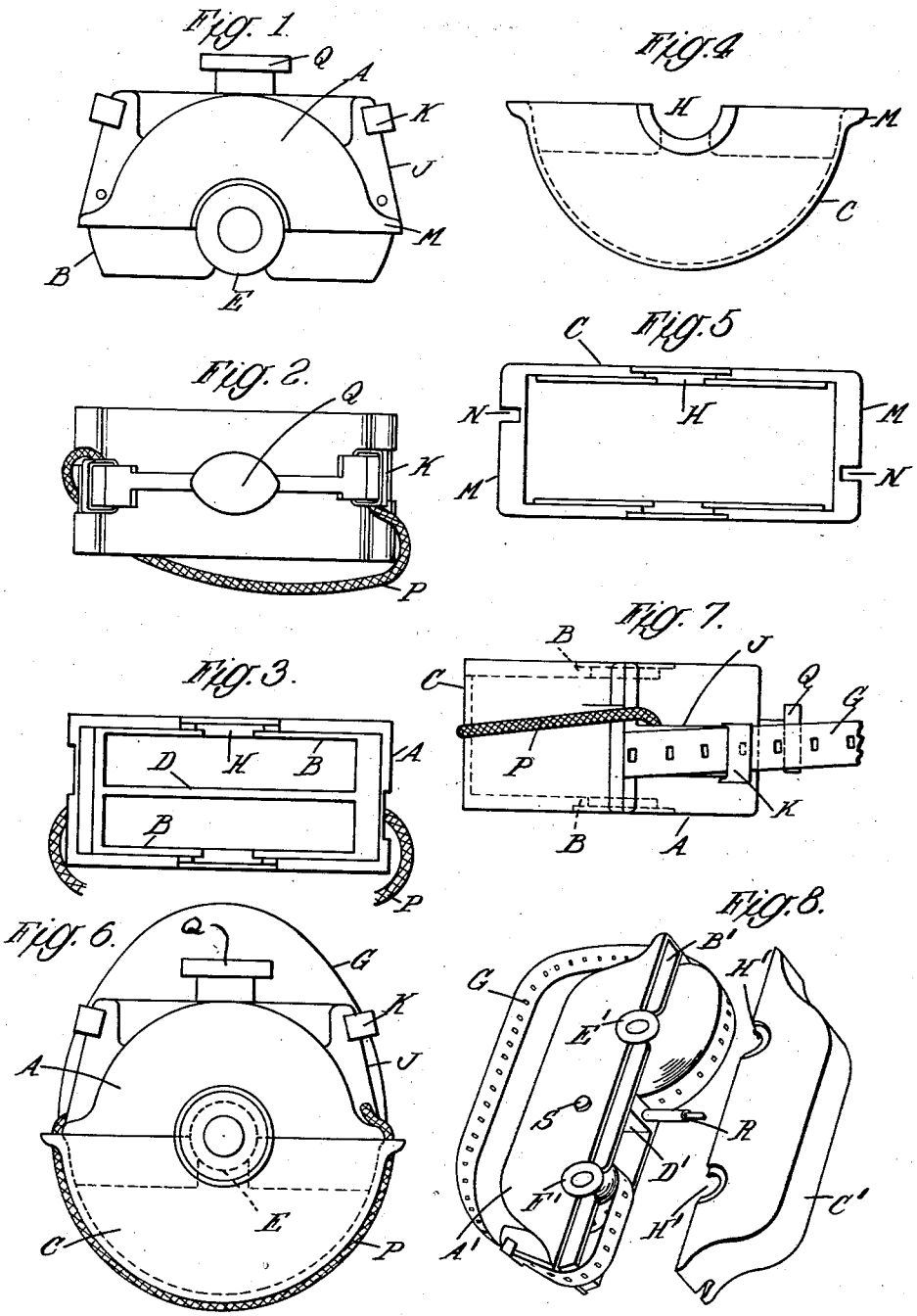

2,166,543

UNITED STATES PATENT OFFICE 2,166,543

FILM MAGAZINE FOR CINEMATOGRAPHIC CAMERAS

Charles Edward Hillery-Collings, Mitcham, England

Application November 23, 1935, Serial No. 51,220
In Great Britain November 26, 1934

3 Claims. (Cl. 242—71)

This invention relates to film magazines for cinematographic cameras, of the kind in which the magazine is divided into two compartments each adapted to contain a reel of film and provided with a bobbin on which the film can be wound from one of the said compartments into the other after passing the film gate, a loop of film being caused to engage a sprocket wheel or other feeding device which takes it past the film gate.

According to the invention the magazine is composed of two semi-circular or approximately semi-circular members or halves, one of which has flanges adapted to enter the other member, a rubber band, spring belt, or other resilient means being provided to draw the two members closely together, and each member being preferably provided with peripheral lugs, ribs, or tongues adapted to engage retaining devices on the camera casing. Loops may be provided on extensions of one of the said members at the front, that is, on the side intended to be placed opposite the film gate, through which a loop of film can be passed, of sufficient length to be passed across the film gate, the members of the magazine being first separated sufficiently to allow the film to be thus manipulated, and being resiliently drawn together before the magazine is removed from the camera.

In order that the said invention may be clearly understood and readily carried into effect the same will now be further described with reference to the accompanying drawings illustrating two examples of construction.

Figure 1 is a plan of the front part of the magazine, Figure 2 a front elevation, and Figure 3 a rear elevation thereof, without the film.

Figure 4 is a plan and Figure 5 a front elevation of the rear part of the magazine.

Figure 6 is a plan and Figure 7 a side elevation of the complete magazine with the film in position.

Figure 8 is a perspective view illustrating a modified arrangement.

Figure 9 represents in elevation, and partly in section, operative mechanism applicable to a film magazine constructed as shown in Figure 8.

Figure 10 shows diagrammatically in plan the parts of a camera casing with which this invention is concerned, with the lid removed.

Figure 11 illustrates in inverted plan a camera lid.

The front member A of the magazine has upper and lower flanges B adapted to fit into the rear member C, the thickness of the flat parts of the latter member being reduced adjacent the front of the said member to accommodate the said flanges.

The interior of the member A is divided into two compartments by a partition D, which may be horizontal as seen in Figure 3 or vertical as in Figure 8. In each of the compartments is housed a bobbin (E, F). These bobbins may be superposed, or may be spaced apart side by side as in Figure 8. The ends of the film G are secured in any known or suitable manner to the said bobbins, and a loop of the film is carried past the film gate so that the film can be wound by a sprocket wheel or other feeding device from one bobbin to the other. The flattened parts of both members A and C may be cut away as seen at H to receive the ends of flanges of the bobbins, and the flanges B may be likewise cut away (see Figures 1 and 8). The member A may be formed with horizontal ribs J at each side, on which are metal or other loops K through which the film is guided freely. At the meeting edges of the members A and C are vertical ribs or protuberances M notched at N for the passage of a rubber cord P or the like, which is secured at its ends to the ribs J and serves to hold the members A and C together in a resilient manner. The camera casing or body W', Figure 10, is surrounded by a flange $W^2$ of less thickness than the wall $W^3$ forming a ledge or shelf $W^4$. The lid X, Figure 11, fits inside the flange $W^2$ and rests on the wall $W^4$. The under or inner side of this lid is provided with two inwardly extending projections Y, which when the lid is placed on the camera after the insertion of the magazine, engage the vertical ribs M on the magazine, and press back the rear member C so that the film can be freely drawn off the bobbins to pass through the film gate Z. The member Q is a securing means in the form of a knob or stud which engages in a slot (Figure 10) W in the camera body or casing when the magazine is introduced into the camera, and thus correctly locates the magazine and prevents movement of the front member when the rear member is drawn backward.

In the modification shown in Fig. 8, the front and rear members of the magazine are marked A' and C', respectively, the flange on the front member marked B', the partition marked D', and the bobbin flanges marked E' and F', while the openings in the rear member for receiving said flanges are marked H'. In this form of the invention, the opening of the magazine is effected by applying pressure upon a stud S connected, as shown in Fig. 9, with a wedge T having a lower extremity $t'$ working in a housing $t^2$ formed in the partition D'. A plunger or member R working in a tube $r'$ projecting from the partition D' is resiliently impelled by a spring $r^2$ to remain in contact with the wedge T.

Thus, when the stud S is depressed by any suitable means, as for example by the action of closing the camera lid, the plunger or member R is pressed out or raised by the wedge T against the magazine member C' and causes separation of the rear member from the front member sufficiently to allow the film to be drawn out at one side and in at the other.

The examples illustrated have been described with the understanding that the spools of film are used in a horizontal position and that the film travels horizontally through the film gate, but it will be clear that the magazine can also be used in a vertical position. As there is no difference between the upper and under sides of the magazine, in the case of a double sided film being used the magazine can be inverted after the film has been wound in one direction, when the film can be wound back to expose the other side of the film.

The magazine can be made of a resinous mouldable material.

By the use of this invention, buckling and tearing of the film will be avoided, as the length of the first loop of film to be threaded into the camera can be exactly regulated, and the film is not caused to pass through narrow annular passages in the magazine.

What I claim and desire to secure by Letters Patent of the United States is:—

1. A film magazine for use in cinematographic apparatus, consisting of two approximately semicircular magazine members adapted conjointly to enclose two film bobbins and dispose their axes in alinement, said magazine members mutually engaging in a plane practically coinciding with the axes of the two bobbins and being readily separable in a direction disposed at right angles to said axes, and one of said magazine members having flat rigid flanges adapted to fit and engage with the other member.

2. A film magazine for use in cinematographic apparatus, consisting of two approximately semicircular magazine members adapted conjointly to enclose at least one film bobbin in position, wherein the axis of said bobbin approximately corresponds with the plane of cleavage on both sides of said magazine members, these magazine members mutually engaging in said plane of cleavage and being readily separable in a direction disposed at the right angles to said axes and plane of cleavage, and one of said magazine members having rigid side and end flanges adapted to fit and engage with the other magazine member and having an exteriorly relieved or slotted portion upon at least one end of the same forming clearance means allowing film from the bobbin within to be drawn out from between said magazine members when they are assembled in closed relation.

3. A film magazine for use in cinematographic apparatus, consisting of two approximately semicircular magazine members adapted conjointly to enclose two film bobbins and dispose their axes in parallelism, said magazine members mutually engaging in a plane of cleavage practically coinciding with the axes of the two bobbins and being readily separable in a direction disposed at right angles to said axes and said cleavage plane, and one of said magazine members having rigid flanges adapted to fit and engage with the other magazine member and having exteriorly relieved or slotted portions at both ends forming clearance means allowing film to be passed out from one bobbin at one end and into the other bobbin at the other end between said magazine members when the same are in assembled relation.

CHARLES EDWARD HILLERY-COLLINGS.